(12) United States Patent
Chick

(10) Patent No.: US 7,759,286 B1
(45) Date of Patent: Jul. 20, 2010

(54) SYSTEM AND METHOD FOR CONTAINING A SPILL

(75) Inventor: Charles T Chick, Pleasant Hill, MO (US)

(73) Assignee: Ameret, LLC, Lenexa, KS (US)

( * ) Notice: Subject to any disclaimer, the term of this patent is extended or adjusted under 35 U.S.C. 154(b) by 0 days.

(21) Appl. No.: 12/434,814

(22) Filed: May 4, 2009

Related U.S. Application Data

(60) Provisional application No. 61/050,319, filed on May 5, 2008.

(51) Int. Cl.
*B01J 20/22* (2006.01)
*B01J 20/24* (2006.01)
*B01J 20/26* (2006.01)

(52) U.S. Cl. ........................ 502/401; 502/402; 502/403; 502/404

(58) Field of Classification Search ................ 502/400, 502/401, 402, 403, 404
See application file for complete search history.

(56) References Cited

U.S. PATENT DOCUMENTS

| | | | |
|---|---|---|---|
| 3,819,514 A | 6/1974 | Clampitt et al | |
| 4,066,539 A | 1/1978 | Hachisu | |
| 4,172,031 A | 10/1979 | Hall et al. | |
| 5,007,969 A * | 4/1991 | Doscher | 510/118 |
| 5,030,591 A * | 7/1991 | Cole et al. | 502/402 |
| 5,104,548 A | 4/1992 | Gabrick | |
| 5,536,898 A | 7/1996 | Conner et al. | |

* cited by examiner

*Primary Examiner*—Timothy C Vanoy
*Assistant Examiner*—Daniel Berns
(74) *Attorney, Agent, or Firm*—David E Herron, II

(57) ABSTRACT

The invention is a system and method for containing a spill of petroleum product. The system includes a combination of ground rubber, beeswax, and ground corn cobs, which is then tossed into an area of a spill, then allowed to remain for a period until a substantial amount of the spilt petrol is adsorbed. Once this period expires, the adsorbed combination can be removed.

16 Claims, 3 Drawing Sheets

SYSTEM AND METHOD FOR CONTAINING A SPILL

INCORPORATION BY REFERENCE

This application claims domestic priority based upon Provisional Patent Application Ser. No. 61/050,319, filed May 5, 2008 which is hereby incorporated in its entirety by reference.

SUMMARY OF THE INVENTION

The invention includes a system and a method of containing a spill of petroleum product.

The inventive method

The inventive method includes the steps of providing ground rubber, and adding a portion of beeswax to the ground rubber to form a mixture. Of course, the method will also require one to position the mixture in an area of the spill of petroleum product. Once properly positioned, the mixture is allowed to remain for a period of time to allow the mixture the adsorb the spill. After an adsorbency period, the mixture (and the adsorbed petroleum product) are removed, perhaps by vacuum removal.

In a preferred embodiment, the invention will include the step of adding an amount of ground corn cobs to the beeswax, preferably in the range of 50%-100% (by weight) of the portion of beeswax.

Preferably, the percentage of beeswax (by weight) in the mixture is in the range of 10%-30%. Overall, the mixture will comprise a substantially homogeneous mixture of 75% rubber, 15% beeswax, and 10% corn cobs (approximately, by weight). In one embodiment of the invention, the ground rubber, corn cobs, and beeswax are each in the range of 20-50 mesh. In another preferred embodiment, the ingredients are each ground and/or palletized into a form that is in the range of 10-40 mesh. Indeed, ingredients of no finer than 30 mesh are well-suited for the invention.

The inventive system

The inventive system will include ground rubber, ground corn cobs, and beeswax in one of a ground, shaved, or pelletized form. The rubber, cobs and beeswax form a mixture that adsorbs petroleum product when deposited on an area containing a spill.

Preferably the amount of ground corn cobs is in the range of 50%-100% (by weight) of the portion of beeswax, and overall the percentage of beeswax (by weight) in the mixture is in the range of 10%-30%. Thus, the system works well if the mixture includes a homogeneous, uniform combination of 75-15-10 percent split of rubber, beeswax and cobs, respectively.

Inasmuch as the invention intends to contain and clean a petroleum spill, the system will also include apparatus for removing the combination of the mixture and adsorbed product from the area. The apparatus may include tillers, vacuums, scrapers, bulldozers, and the like. It has been found that ingredients no finer than 30 mesh are preferred, as material too finely ground may become difficult to remove from the area once full adsorbency has occurred.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
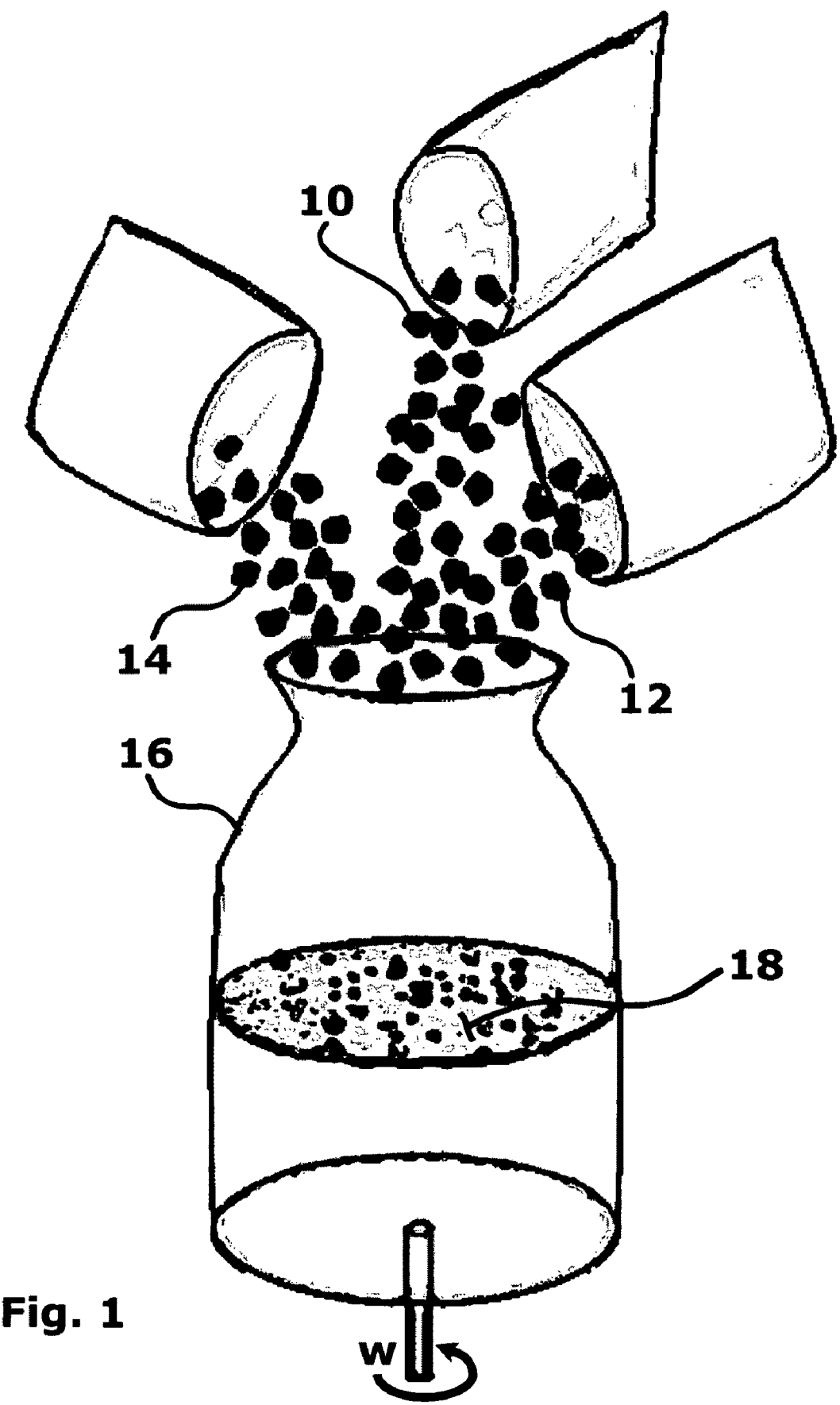
FIG. 1 is a perspective view detailing the inventive method of combining ingredients to form an adsorbent mixture, according to the principles of the invention.

FIG. 1 shows a perspective view that details combining ingredients to form an adsorbent for containing a spill of petroleum product. First, ground rubber 10, beeswax 12 in pelletized or shaved form, and ground corn cobs 14 are poured into a mixing vat 16 to form a mixture 18. The vat 16 is agitated by rotating at an angular speed w until the mixture 18 forms a substantially uniform and homogeneous combination of ingredients.

Figure 2:
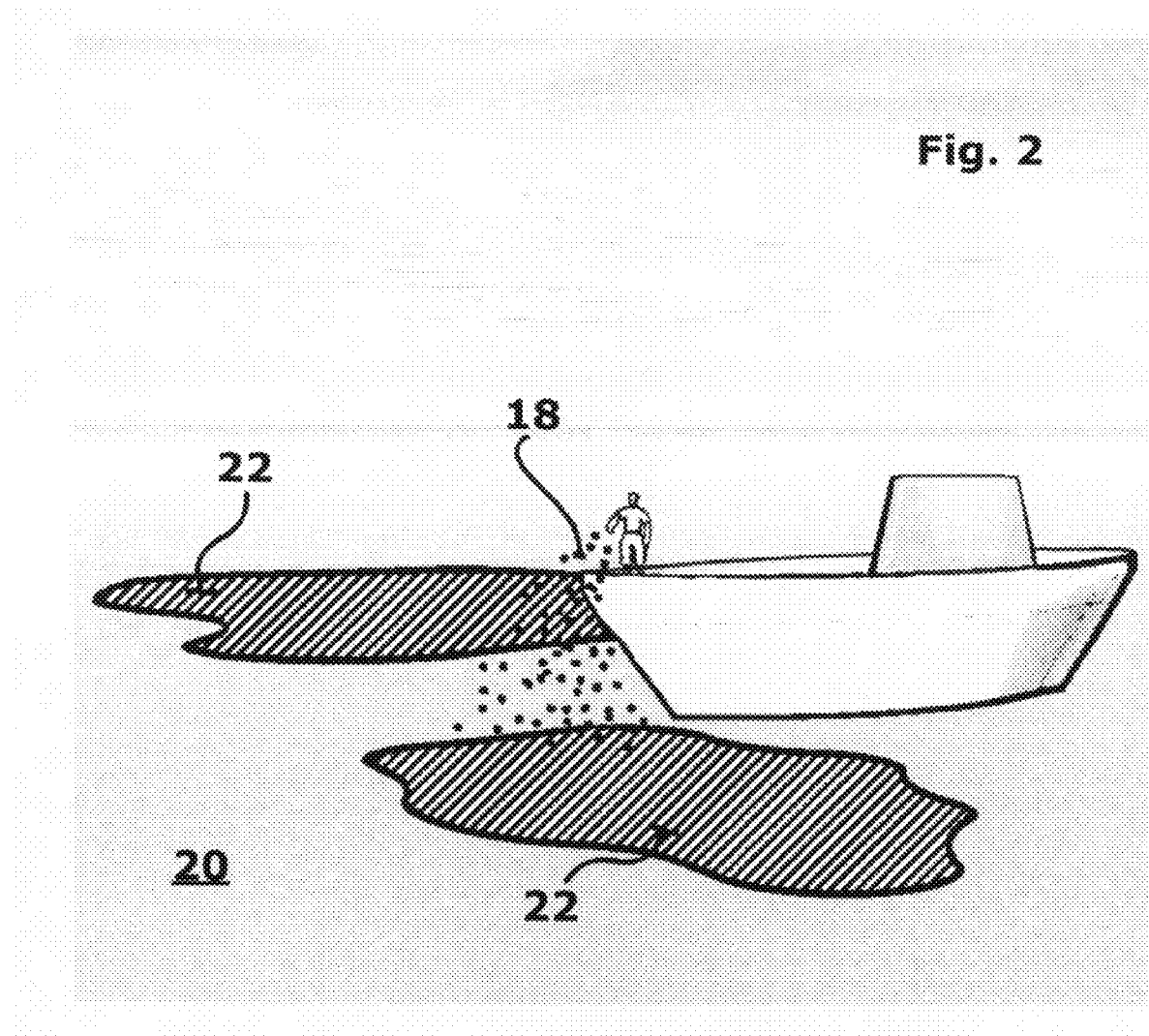
FIG. 2 shows a perspective view of the invention used on a marine petroleum spill.

FIG. 2 shows the inventive system and method used to contain a spill of oil 22. In this figure, the area 20 of the spill is a marine environment wherein oil (or other petroleum product) 22 may be floating adjacent the surface of water. The mixture 18 is introduced into the area 20 by tossing it from a vessel (such as a boat or plane).

Figure 3:
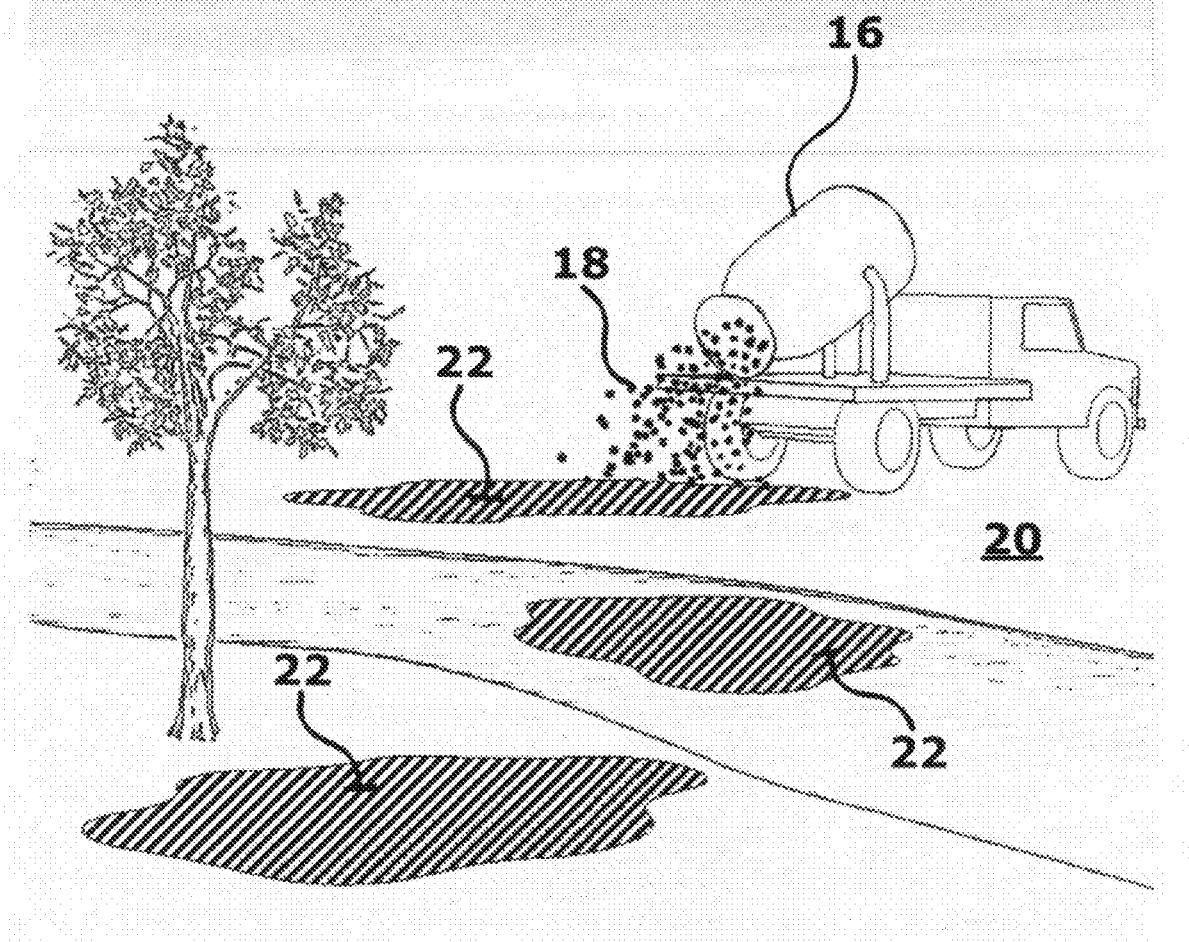
FIG. 3 shows a perspective view of the invention being used to contain an oil spill on land.

As shown in FIG. 3, the invention is also well-suited to contain spills that occur on land or adjacent inland water, such as rivers, creeks, or streams. In this embodiment, a vat 16 containing the mixture 18 is positioned adjacent the area 20 of the spilled petroleum 22. The vat 16 may be emptied from a truck (as shown), or tossed by hand, or even dropped from the air.

Still referring to FIG. 3, once the mixture 18 is positioned in the area 20, one should wait until the adsorbent qualities of the mixture 18 contain, attract, and adsorb the dangerous petroleum 22. Once the mixture 18 adsorbs the spill, then it should be removed from the land and/or water by any known method, such as a vacuum, grater, tiller, or the like. In a preferred embodiment, the invention may also include the step of capturing the oil and re-refining it.

Although the present invention has been described and illustrated in detail, it is to be clearly understood that the same is by way of illustration and example only, and is not to be taken by way of limitation. The spirit and scope of the present invention are to be limited only by the appended claims that precisely define the metes and bounds of the invention.

I claim:

1. A method of containing a spill of petroleum product, the method including the steps of:
    providing ground rubber;
    adding a portion of beeswax to the ground rubber to form a mixture and,
    adding an amount of ground corn cobs to the mixture, the amount of corn cobs being in the range of 50%-100% (by weight) of the portion of beeswax;
    positioning the mixture in an area of the spill of petroleum product.

2. The method as in claim 1, wherein the percentage of beeswax (by weight) in the mixture is in the range of 10%-30%.

3. The method as in claim 1, further including the step of agitating the mixture until the mixture forms a substantially homogeneous combination of ingredients.

4. The method as in claim 1, wherein the mixture contains
    approximately 75% (by weight) of ground rubber;
    approximately 15% (by weight) of beeswax; and,
    approximately 10% (by weight) of ground corn cobs.

5. The method as in claim 1, further comprising the step of Selecting the ground rubber to be in the range of 20-50 mesh.

6. The method as in claim 1, wherein the ground rubber is no finer than 30 mesh.

7. The method as in claim 1, further comprising the step of providing the beeswax in one of a pelletized or granulated form; and, ascertaining that the beeswax is in the range of 10-40 mesh.

8. The method as in claim 7, wherein the beeswax is no finer than thirty mesh.

9. The method as in claim 1, further including the step of allowing the mixture to remain in the area until the mixture adsorbs the petroleum product.

10. The method as in claim 9, further including the step of removing the mixture from the area.

11. A system for containing a spill of petroleum product, the system comprising ground rubber;

ground corn cobs; and beeswax in one of a ground, shaved, or pelletized form, wherein amount of corn cobs is in the range of 50%-100% (by weight) of the portion of beeswax;

wherein the rubber, the cobs and the beeswax forming a mixture;

and wherein, the mixture is deposited on an area containing the spill and allowed to adsorb the petroleum product.

12. The system as in claim 11, wherein the percentage of beeswax (by weight) in the mixture is in the range of 10%-30%.

13. The system as in claim 11, wherein the mixture forms a substantially homogeneous combination of ground beeswax, ground rubber and ground corn cobs.

14. The system as in claim 11, wherein the mixture includes approximately 75% (by weight) of ground rubber;

approximately 15% (by weight) of beeswax; and, approximately 10% (by weight) of ground corn cobs.

15. The system as in claim 11, wherein the ground rubber, beeswax, and ground corn cobs are in a range of 20-50 mesh.

16. The system as in claim 15, wherein the range is no finer than 30 mesh.

* * * * *